Sept. 9, 1952          D. LUNDY          2,610,148
BROMINE WATER FEEDER
Filed Aug. 29, 1949
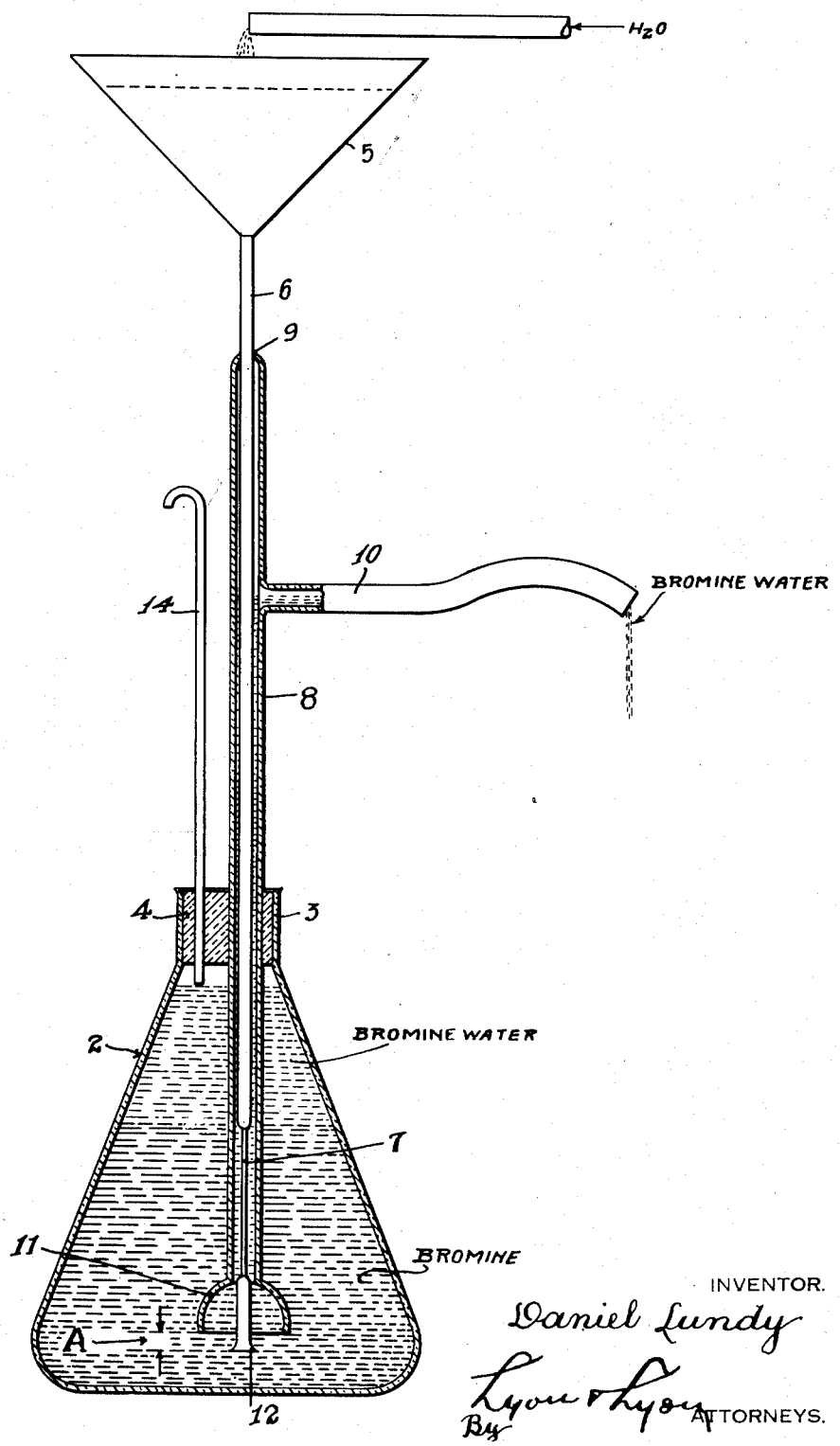
INVENTOR.
Daniel Lundy
By Lyon & Lyon
ATTORNEYS.

Patented Sept. 9, 1952

2,610,148

UNITED STATES PATENT OFFICE 2,610,148

BROMINE WATER FEEDER

Daniel Lundy, Trona, Calif., assignor to American Potash & Chemical Corporation, Trona, Calif., a corporation of Delaware Application August 29, 1949, Serial No. 112,893

1 Claim. (Cl. 210—29)

This invention relates to an apparatus for automatically and continuously feeding bromine water, and is particularly directed to an apparatus designed to supply bromine water continuously and in very small amounts and to supply this bromine water at a constant concentration for any particular feed rate.

In the operation of cooling towers it is difficult to control algae and bacterial slimes. In the past it has been the practice to attempt to control algae by the use of certain stable and non-volatile chemicals, such as sodium pentachlorphenate. This chemical is added in high concentration to the cooling tower about once a month, but at the end of the month it is frequently found that an appreciable growth of organic matter exists, which impairs seriously the cooling system used in connection with the tower.

In the operation of small cooling towers, the daily loss of water from the tower frequently exceeds the total volumetric capacity of the tower so that no matter how much algicide is added at the beginning of the month, that remaining in the tower at the end of the month is very small, indeed. The proper method of control of the algicide is to add the algicide in a continuous manner, but because the amount required is so small, it has heretofore been found impracticable to provide an apparatus for automatically and continuously adding algicide. For large installations there are available commercial feeders for the automatic and continuous addition of algicide.

Bromine is effective as an algicide when added in proper quantities to the makeup water of a cooling tower. While the amount to be added is subject to considerable variation, a sufficient quantity to maintain a residual of about one part per million should be employed in the average case. To maintain such a residual in the average case, about 11 parts per million of bromine must be added to the water of the cooling tower every twenty-four hours. Thus, for example, where bromine is added as bromine water containing about 3% of bromine, to obtain the desired 11 parts per million, about 367 parts per million of bromine water is required. A small cooling tower may have a total volume of 100 gallons of water in the cooling tower system. To maintain a normal residual in such a tower approximately 7 milliliters per minute of bromine water must be added. It can readily be seen that a smaller cooling tower and a lesser bromine demand would combine to reduce the amount of bromine water which must be added. Although the average case may require a residual to be maintained of one part per million, there are some cases in which a residual of $\frac{1}{10}$ of a part per million is sufficient. In such cases the amount of bromine to be added is still less than the amounts noted above.

It is the general object of the present invention to provide an apparatus for supplying bromine water which is capable of supplying the small amount required, for example, for cooling towers.

Another object of the present invention is to provide an apparatus which is simple, inexpensive, foolproof in action and automatic in operation.

A further object of the present invention is to provide a simple apparatus which is not only capable of automatically supplying bromine water in small amounts as required but which apparatus is also capable of supplying a bromine water of substantially uniform bromine concentration.

The apparatus of the present invention will be fully understood from the following description of a preferred form or example of the invention as illustrated in the accompanying drawing in which the figure is an elevation mainly in section.

Referring to the drawing the apparatus of the present invention comprises a container 2 which in the start of the operation of the apparatus of the present invention is intended to be filled with bromine. As illustrated, the container 2 may be in the form of a glass bottle or flask having a reduced neck 3 closed by a stopper 4.

The apparatus also includes a funnel 5 which is designed to collect water to which the bromine is to be added. This funnel is provided with a tube 6, a portion, at least, of the lower end thereof as indicated at 7 being in the form of a capillary tube. The size of the capillary opening of the section 7 of the tube 6 or the length of the capillary opening of the section 7 may be altered to thereby alter the flow rate through the device. Through the use of a tube having a capillary section (i. e. one having a bore of a millimeter or less) it is possible to provide a device which will supply as little as one or a few hundredths of a milliliter per minute of bromine water.

Telescoped over the tube 6 is a second tube 8 which provides, in the major portion of its length, an annular passage for flow of bromine water, the upper end of the tube 8 being sealed as indicated at 9 to the tube 6. A medial portion of the tube 8 joins with a transverse tube 10 for the delivery of the bromine water. At the lower end of the tube 8 the tube terminates in a bell 11, and the tube 6 has a section extending to a depth somewhat below the rim of the bell 11 as indicated at 12, there thus being provided a small vertical spacing A between the lower end of the tube 6 and the bottom of the bell 11.

There is also provided a bent tube 14 leading through the stopper 4 to the contents of the container 2.

In the use of the apparatus of the present invention the apparatus with the flask or bottle 2 filled with bromine water is placed in position to collect a drip of water falling through a tower. In practice the funnel 5 may overflow continuously and a constant head of fluid is therefore provided for effecting a slow flow of water through the capillary section 7 of the tube 6. This soon causes a displacement of any bromine in the capillary tube and the water leaves the end 12 of the capillary and rises into the bell 11. Bromine in the bell 11 and in the tube 8 is soon displaced. The apparatus is then in normal operation with the water passing slowly down the capillary section 7 then rising through liquid bromine only a short distance A between the end of the capillary tube 6 and the rim of the bell 11. In this short passage a substantially fixed amount of bromine is dissolved and carried away by the water which flows up tube 8 and out of the lateral tube 10 where it is passed to the pan of the cooling tower.

By the arrangement of apparatus including the concentric capillary tube 6 and outer tube 8 with collecting bell 11 an apparatus is provided by which a substantially constant concentration of bromine is achieved in the water leaving tube 10, independent of the height of bromine in the container 2.

With the apparatus of the present invention it is found possible to install the apparatus for operation with very infrequent attention and that in practical operation it is capable of regulating the addition of bromine to the cooling tower water so as to effect the efficient control of algicides.

While the particular form of the apparatus herein described is well adapted for carrying out the objects of the present invention various modifications and changes may be made and this invention includes all such modifications and changes as come within the scope of the appended claim.

I claim:

A bromine water feeder comprising, a container adapted to hold bromine and bromine water, a tube entering said container and discharging into the lower portion thereof, said tube constituting means for maintaining a fixed hydraulic head at the outlet of said tube, said tube including a capillary portion for limiting the rate of flow through said tube, a bell having a collecting rim within said container, the collecting rim being disposed at elevations slightly above the lower opening of said tube, and positioned to collect water discharged from said tube, and an outlet conduit for the water collected by said bell connected thereto.

DANIEL LUNDY.

REFERENCES CITED

The following references are of record in the file of this patent:

UNITED STATES PATENTS

| Number | Name | Date |
|---|---|---|
| 839,892 | Rottmann | Jan. 1, 1907 |
| 1,197,337 | Bonfield | Sept. 5, 1916 |
| 1,995,639 | Henderson | Mar. 26, 1935 |
| 2,023,552 | Savage | Dec. 10, 1935 |
| 2,277,230 | Gygax | Mar. 24, 1942 |
| 2,422,258 | Prager | June 17, 1947 |
| 2,461,334 | Major | Feb. 8, 1949 |
| 2,532,973 | Wallentin et al. | Dec. 5, 1950 |